(12) United States Patent
Dalaa (10) Patent No.: US 9,870,479 B2
(45) Date of Patent: *Jan. 16, 2018

(54) METHOD OF HANDLING A DOCUMENT STORED IN A CLOUD STORAGE SYSTEM AND ASSOCIATED USER CREDENTIALS FOR PROCESSING BY AN AUTHENTICATED PRINTING SYSTEM AND SYSTEM FOR PERFORMING THE METHOD

(71) Applicant: NEXT PRINT TECHNOLOGIES APS, Nærum (DK)

(72) Inventor: Tavs Dalaa, Frederiksberg C (DK)

(73) Assignee: NEXT PRINT TECHNOLOGIES APS, Naerum (DK)

(*) Notice: Subject to any disclaimer, the term of this patent is extended or adjusted under 35 U.S.C. 154(b) by 0 days.

This patent is subject to a terminal disclaimer.

(21) Appl. No.: 15/031,507

(22) PCT Filed: Oct. 25, 2013

(86) PCT No.: PCT/IB2013/059674
§ 371 (c)(1),
(2) Date: Apr. 22, 2016

(87) PCT Pub. No.: WO2015/059526
PCT Pub. Date: Apr. 30, 2015

(65) Prior Publication Data
US 2016/0267282 A1    Sep. 15, 2016

(51) Int. Cl.
*G06F 21/60* (2013.01)
*G06F 3/12* (2006.01)
*G06F 21/31* (2013.01)

(52) U.S. Cl.
CPC .......... *G06F 21/608* (2013.01); *G06F 3/1296* (2013.01); *G06F 21/31* (2013.01)

(58) Field of Classification Search
None
See application file for complete search history.

(56) References Cited

U.S. PATENT DOCUMENTS 7,565,400 B2    7/2009  Wangoo et al.
8,310,703 B2   11/2012  Nuggehalli et al.
(Continued)

FOREIGN PATENT DOCUMENTS

WO    WO 2013/113926 A1    8/2013

*Primary Examiner* — Ming Hon
(74) *Attorney, Agent, or Firm* — Birch, Stewart, Kolasch & Birch, LLP (57) ABSTRACT

Due to different formats for documents, in particular different means of identifying users, it is a problem how to handle a document in a cloud storage system, in which a user is identified by first user credentials, for processing by an authenticated printing system for which the user is identified by second user credentials. This problem is solved by a method comprising the steps of: i. obtaining the document from the cloud storage system, the document comprising document metadata comprising the first user credentials, ii. obtaining the second user credentials based on the first user credentials, iii. obtaining a print job corresponding to the document, the print job comprising print job metadata comprising the second user credentials, and iv. forwarding at least the print job metadata comprising the second user credentials, to the authenticated printing system for the processing. A system and a computer program product for performing the method are also provided.

20 Claims, 1 Drawing Sheet

(56) References Cited

U.S. PATENT DOCUMENTS

| | | | | |
|---|---|---|---|---|
| 2002/0114013 | A1* | 8/2002 | Hyakutake | G06T 1/0021 358/3.28 |
| 2004/0230572 | A1* | 11/2004 | Omoigui | G06F 17/30528 |
| 2006/0026232 | A1* | 2/2006 | Malik | G06Q 10/107 709/204 |
| 2006/0274355 | A1* | 12/2006 | Ferlitsch | G06F 21/608 358/1.15 |
| 2009/0009802 | A1* | 1/2009 | Shaw | G06F 21/608 358/1.15 |
| 2010/0083133 | A1* | 4/2010 | Takayama | G06Q 10/107 715/752 |
| 2010/0302579 | A1 | 12/2010 | Nuggehalli et al. | |
| 2011/0145351 | A1* | 6/2011 | Lee | G06F 3/1206 709/206 |
| 2013/0007450 | A1* | 1/2013 | Janyavula | H04L 63/10 713/168 |
| 2013/0070288 | A1* | 3/2013 | Muranaka | G06F 3/1204 358/1.15 |
| 2013/0083353 | A1* | 4/2013 | Nishikawa | G06F 3/1206 358/1.15 |
| 2013/0188221 | A1 | 7/2013 | Ohno | |
| 2013/0235418 | A1* | 9/2013 | Tanaka | H04N 1/00228 358/1.15 |
| 2013/0242334 | A1* | 9/2013 | Ichida | G06F 3/1222 358/1.14 |
| 2015/0339082 | A1* | 11/2015 | Yeung | G06F 3/126 358/1.15 |
| 2016/0328187 | A1* | 11/2016 | Nathani | G06F 3/1205 |

* cited by examiner

METHOD OF HANDLING A DOCUMENT STORED IN A CLOUD STORAGE SYSTEM AND ASSOCIATED USER CREDENTIALS FOR PROCESSING BY AN AUTHENTICATED PRINTING SYSTEM AND SYSTEM FOR PERFORMING THE METHOD

TECHNICAL FIELD

The present invention concerns a method of handling a document stored in a cloud storage system for processing by an authenticated printing system. More particularly, the present invention concerns a method of handling a document stored in a cloud document storage system, in which a user is identified by first user credentials, for processing by an authenticated printing system for which the user is identified by second user credentials.

BACKGROUND ART

Generally printers used by higher education institutions and corporate organizations are connected to an internal or local network so that the printers may be shared between the users, i.e. the students and staff or workers.

In order to control access as well as to control or limit the costs associated with printing, document management or print accounting systems, collectively referred to as authenticated printing systems, are used for tracking and accounting for printing activity. Print activity tracking and accounting is typically based on a user's network username. For this to work, each print job should comprise the user's network username in the print job details. Accordingly, when a user prints a document from his personal computer, PC, the print job generated from the document has the users network username in the job details or print job metadata, e.g. in the header of the print job file, for use by the authenticated printing systems. When the user prints from a conventional PC, the network user name is readily available for incorporation in the print job details as the user typically logs on onto the PC, and onto the local network to which the PC is connected, using the network user name.

Conventionally the document to be printed is stored on the user's PC or on a server on the internal or local network. With this set up, the user is required to access his PC, or at least be logged into the internal or local network, if he wishes to access the document in order to print it. This restriction of the users freedom in regard to the location he can access and print the document from has in pad been mitigated by, on one hand storing the document to be printed on a portable storage media such as a portable hard drive or memory stick, and on the other hand the use of Virtual Private Network (VPN) technology allowing the user to initiate a connection for secured access to the internal or local network from another location such as his home. These solutions, while allowing the user a degree of freedom in his location when accessing the document, are however not without drawbacks. Using a portable storage medium entails the risk of losing the portable storage medium and thus the possible release of the document to unauthorized user's. Furthermore, different versions of a document on the user's PC a work and on the users portable storage medium may lead to confusion and mistakes. Using VPN technology also has its drawbacks as the VPN technology may be costly to implement and difficult to use for the user.

In the face of these challenges, and driven by the desire to allow the user to access his document from any location in a simple way, "Cloud storage" systems, also known as "Online storage" services or "Cloud storage" services, one example being the Google Drive™ online storage service, have been devised. "Cloud" in "Cloud Storage" is related to the concept of Cloud Computing, which comprises network based services provided by virtual servers running and distributed on one or more real servers. "Online" in online service refers to that the service is accessed via the Internet. Thus, an online service is a service that can be accessed over the internet. Thus, the service may be accessed from any location from which access to the cloud storage system, typically via the internet, is possible.

To use the Cloud storage system the used registers a user account with a cloud storage system and subsequently uploads documents and files of various file formats to the user account. The documents are then stored in the cloud storage system or in databases or servers accessible to the cloud storage system. When the user needs to retrieve a document, he can use any PC set up to allow access to the cloud storage system, typically via the internet, to navigate to a web site hosted by the cloud storage system, where he identifies himself with his user credentials in order to gain access to his user account to browse and download any of the documents stored in association with his used account.

In this way the user may access his documents from any location, such as his home using his home PC, from which access to the cloud storage system is available, in order to download the document he wishes to print to his computer, wherefrom he may print it on a printer.

There is thus no need for complicated solutions for establishing secured access to the internal or local network where the user works, nor is the user required to carry around a portable storage medium.

Techniques for handling and printing documents stored in cloud storage systems and other types of external storage systems are known from inter alia WO13113926A1, U.S. Pat. No. 7,565,400B2 and U.S. Pat. No. 8,310,703B2.

DISCLOSURE OF INVENTION

A user may connect to a cloud storage system to retrieve and save a document to his PC, where after he may open the document using the software application corresponding to the file format of the document to print it on a personal printer, or most commonly on an authenticated printing system. However, if the user wishes to print the document without having to manually download and open it, or if the user does not wish to, or cannot, open the document to print it, the latter typically being the case where the user uses a PC that does not have installed the software application required to open the document, or where the user uses a tablet PC or a Smartphone for which the required software may not be available, difficulties arise.

These difficulties are caused by inter alia the fact that the cloud storage system and the authenticated printing system may use different formats for print jobs, including different means of identifying users.

Firstly the user, when wishing to print a document on a cloud storage system, may not be logged in to the local network, i.e. the network in which the authenticated printing system is placed, at all. Thus, the print job that is to be created for the document may not include any user credentials, which makes it difficult to authenticate the user and to authenticate that the user is allowed to print using the authenticated printing system.

Secondly, many of the devices from which the user may use to browse and select documents to print, do not, due to limited computational and memory resources, comprise the software application for opening the document and further do not create print jobs in the conventional sense, i.e. converting the document to be printed into a form printable by the printer and including print job details, as these devices do not use printer drivers.

Further, where a user connects to the cloud storage system using a wireless connection provided by a wireless service provider, such as where the user uses a Smartphone, the cost associated with downloading a document, due to the volume of data downloaded, may be prohibitive.

Thus, these difficulties include the difficulty to print the document without the user first having to download it, the difficulty to authenticate the user submitting the print job so as to prevent printing by unauthorized users, the difficulty to provide secure printing, i.e. printing the document only when the correct user is positioned at the printer, and the difficulty to track and perform accounting of the print job so as to for example control or limit the allowable number of pages to print.

It is therefore an object of the present invention to simplify and/or improve printing of a document stored in a cloud storage system on authenticated printing systems.

Accordingly, it is an object of the present invention to provide a method of handling a document stored in a cloud storage system for processing by an authenticated printing system which does not require the user to manually download and open the document.

It is a further object of the present invention to provide a method of handling a document stored in a cloud storage system for authenticating a user associated with the document.

It is a further object of the present invention to provide a method of handling a document stored in a cloud storage system for providing secure printing.

It is a further object of the present invention to provide a method of handling a document stored in a cloud storage system for tracking and performing accounting of print jobs.

It is also an object of the present invention to provide a system for performing the method for achieving at least one of the above mentioned objects.

It is additionally object of the present invention to provide software configured for causing a computer on which the software runs to perform the method for achieving at least one of the above mentioned objects.

At least one of the above objects, or at least one of any of the further objects which will be evident from the below description, is according to a first aspect of the present invention achieved by the method according to claim 1.

By obtaining a print job corresponding to the document, the print job, comprising print job metadata comprising the second user credentials, as seen from the point of view of the authenticated printing system, comprises the required second user credentials and may be processed. The authenticated printing system may thus perform authorization of the user, secure printing of the print job, tracking of the print job, and/or accounting of the print job as if the print job originated from for example a conventional PC and having the second user credentials in the metadata from the start.

Furthermore, the user may print the document also using a user device, e.g. a tablet PC or Smartphone, which does not comprise the software application needed for opening the document not the printer driver needed for obtaining the print job.

As seen from the above, the method according to the first aspect of the present invention simplifies and/or improves printing of a document stored in a cloud storage system on authenticated printing systems.

The steps are preferably performed from step i to iv.

The steps of the method may be performed by a processing server.

Handling may comprise printing, attempting to print and/or storing for later printing.

In the context of the present invention "handling a document stored in a cloud storage system, in which a user is identified by first user credentials, for processing by an authenticated printing system for which the user is identified by second user credentials" is to be understood as encompassing "integrating external document storage solutions, in which a user is identified by first user credentials, with an authenticated printing system for which the user is identified by second user credentials".

The cloud storage system is preferably Google Drive™, but it may alternatively be any of similar cloud storage systems accessible by the user via a public cloud, such as DropBox™, Microsoft Skydrive®, Microsoft Office 36®, etc. CloudM®, iCloud®, ownCloud®, ShareFile®, SugarSyn®, etc.

The user may be a student or staff at a higher education institution, or a worker or employee of a corporate organization.

In the context of the present invention, the user is to be understood as encompassing the document owner and the print job owner.

The user may communicate with the processing server for selecting which document stored in the cloud storage system to print using a user device, such as a Smartphone, tablet PC, conventional PC, thin client PC or packaged laptop, such as a Chromebook™. The processing server may host a website or web interface, which the user can connect to via http or https for selecting the document. Alternatively, the selection of the document may be made in an email or as an attachment to an email.

The first user credentials are used for authenticating the user to the cloud storage system and for associating a user account with the user. The user then uploads documents to the cloud storage system, the documents being associated with the first user credentials and/or the user account.

The first user credentials may comprise an email address, a username, a telephone number, an IP address or a code unique to the user. The first user credentials may further comprise a password associated with the email address, the username, the telephone number, the IP address or the code to prevent unauthorized access to the user's account at the cloud storage system.

The authenticated printing system may comprise an authentication server, such as an LDAP server, and/or a tracking and accounting server, such as a server running Pcounter, Equitrac, PaperCut, or other print tracking and accounting software.

The second user credentials may comprise a network user name, an email address, a telephone number, an IP address or a code unique to the user. The second user credentials may further comprise a password associated with the email address, the network username, the telephone number, the IP address of the code to prevent unauthorized access to the authenticated printing system.

Typically the first and second user credentials are different. This is due to the user often registering his account with the cloud storage service using first user credentials which he has chosen himself. The second user credentials are, however, most often set by the administrator of the authenticated printing system according to a scheme, such as an abbreviation of the user's name, possibly including year of admittance in the case of an authenticated printing system of a higher education institution. In a corporate organization the second user credentials may instead include an indication of the department that the user is employed in.

It may happen that users have first and second credentials that are the same. For example, a user may choose to use the same user name both for the cloud storage system and the authenticated printing system. Alternatively, the administrator of the authenticated printing system may create an account with the cloud storage system for every user that uses the authenticated printing system. In this case however there is still the need of obtaining the document and obtaining the print job corresponding to the document. The second user credentials are still obtained based on the first user credentials, for example using a user credentials mapping database as described below, or using a rule specifying that the second user credentials is, or is a copy of, the first user credentials.

If the first and second user credentials are both email addresses, they are typically different; but they may be the same.

The second user credentials are used for authenticating the user to the authenticated printing service in order to identify the user to the authenticated printing service so that the authenticated printing service may process the print job.

The first user credentials may be associated with the document by being used to log in to the cloud storage system for obtaining the document in step i, by being included in the name of the document or the file name of the document, or by being included in the document metadata. The document metadata may for example comprise data fields stating the author of the document, or the owner of the document, or the creator of the document.

Further the first user credentials may be associated with the document by being included in the contents, such as text in a text document, of the document.

Obtaining the print job typically comprises converting the document using an application corresponding to the format of the document to open the document and a printer driver for converting the document to make it readable by a printer.

In the context or the present invention, print job metadata are to be understood as encompassing print job details. The metadata may comprise the name or other identification information, including a network address, of the printer on which the print job is to be printed. In a print job, the print job metadata may refer to the part of the file written in PJL (Printer Job Language) language, comprising for example the field Username, which may comprise the second user credentials, while the print job itself is the part of the file written in PDL (Page Description Language), PS (PostScript) or PCL (Printer Command Language) language.

In the context of the present invention, obtaining the second user credentials based on the first user credentials is to be understood as encompassing obtaining the second user credentials using the first user credentials.

In other words: There is a relationship between the first user credentials and the second user credentials such that the second user credentials may be obtained if the first user credentials are known. This may be achieved by a relational database, i.e. where the first user credentials are related to the second user credentials. Another possibility is that a function operating on the first user credentials generates the second user credentials. For example, if the first user credentials comprise an emails address, such as user@company.com, the second user credentials may be generated by a function operating on the first user credentials by returning only the letters prior to the @ sign, i.e.

returning only "user". If, as discussed above, the first and user credentials are the same, then the function is a simple copy or equals function.

The print job metadata may comprise both the first and second user credentials as long as the second user credential are present in the field of the metadata in which the authenticated printing system expects to find the owner, i.e. the user, associated with the document and the print job.

If the first user credentials are already located in the field of the print job metadata in which the authenticated printing system expects to find the owner of the print job, then the first user credentials are exchanged for, or substituted by, the second user credentials.

In the context of the present invention forwarding at the print job metadata comprising the second user credentials to said authenticated printing system for said processing is to be understood as encompassing forwarding the print job, comprising the print job metadata comprising the second user credentials, to the authenticated printing system for the processing.

Generally it may be sufficient to forward only the metadata to the authenticated printing system for the processing, but preferably the print job, including the metadata, is forwarded to the authenticated printing system for the processing.

The embodiments according to claim 2 define different ways of processing the print job by the authenticated printing system.

Authenticating may comprise comparing said second user credentials to a list of second user credentials associated with users allowed to print using the authenticated printing system.

Tracking may comprise listing the print job in a log.

Accounting the print job may comprise debiting the account associated with the user by for example subtracting the number of pages of the print job from a quota of printable pages, or subtracting the cost of printing the print job from a balance. Accounting the print job may alternatively, or additionally, comprise storing information about the print job for later presentation to the user.

Forwarding the print job may comprise forwarding the print job to a printer comprised by the authenticated printing system, or alternatively forwarding the print job to a printer connected to the authenticated printing system. In either case, the forwarding may be via a print server being part of the authenticated printing system, or alternatively be separate from the authenticated printing system.

The printer may be a laser printer or ink jet printer, a multifunctional printer (MFP), or a reprographic machine.

Claim 3 defines a preferred embodiment of the method according to the present invention. Converting the print job for making it printable by a printer may comprise using the software application corresponding to the file format of the document to open or read the document, followed by using a printer driver corresponding to the printer on which the document is to be printed to convert the document into a print job written in a suitable printer language such as PS (PostScript), PCL (Printer Command Language) or similar.

Preferably, the obtaining of the print job also comprises rendering the print job, such as into a bitmap.

Claim 4 defines a preferred embodiment of the method according to the present invention. In the context of the present invention, the reference to the document is to be understood as comprising a selection of the document.

Preferably the obtaining of the document further comprises receiving the first user credentials.

The reference to the document may be received via a web site accessible to the user.

Claim 5 defines a preferred embodiment of the method according to the present invention. In the context of the present invention, the user credentials mapping database is to be understood as encompassing a relational database or other database type storage.

The user credentials mapping database may be one or more tables in an SQL database. Querying the user credentials mapping database may comprise using the first user credentials in an SQL SELECT statement to retrieve the second user credentials related to the first user credentials.

Retrieving the second user credentials may comprise receiving the output of an SQL SELECT statement.

Obtaining the second user credentials from the user may comprise contacting the user using the first user credentials, or using information in the print job metadata.

Claim 6 defines a preferred embodiment of the method according to the present invention. If the first user credentials comprise an email address associated with the user, it becomes very easy to contact the user by sending an email to he email address. The obtaining of the second user credentials from the user may comprise receiving an email from the user comprising the second user credentials, or directing the user to a website for receiving the second user credentials.

In the context of the present invention, an email address associated with the user is to be understood as encompassing an email address accessible and usable by the user for at least receiving email.

Claim 7 defines a preferred embodiment of the method according to the present invention. If the second user credentials are to be obtained from the user, it is preferred that the second user credentials are stored in the user credentials mapping database mapped to the first user credentials, so that the next time the user wishes to print a document stored in the cloud storage system using the authenticated printing system, the second user credentials will be present in the user credentials mapping database, so that there is no need to obtain the second user credentials from the user this time.

It is contemplated within the context of the present invention that the obtaining of the second user credentials from the user may further compose forwarding the second user credentials to the authenticated printing system for determining whether or not the user has an account registered with or in the authenticated printing system for authenticating, tracking and/or accounting, and if the user does not have an account with or in the authenticated printing system, create an account for the user with or in the authenticated printing system.

Claim 8 defines one embodiment of the method according to the present invention. The holding queue may be located in the authenticated printing system or in the processing server.

The release code may be an alphanumerical string. The release code may be generated by the authenticated printing system or it may be generated by the processing server.

Providing the release code to the user may comprise sending the release code in an email, in a SMS or MMS, by direct messaging or by publishing the release code on a website reachable by a unique URL sent to the user.

Receiving the release code may comprise receiving the release code in an email, SMS or MMS, or receiving the release code on a website hosted by the authenticated printing system or the processing server. The website may be displayed on a display of the printer or on a computer in the vicinity of the printer.

Releasing the document or the print job from the holding queue may comprise forwarding the print job, comprising the print job metadata comprising the second user credentials, to the authenticated printing system for the processing, or alternatively performing step iii of the method according to the first aspect of the present invention, i.e. obtaining a print job corresponding to the document, the print job comprising print job metadata comprising the second user credentials.

If the document is to be held in the holding queue, then steps ix to xi should be performed after step ii and before step iv.

Claim 9 defines a preferred embodiment of the method according to the present invention. Obtaining the registration information on the printer may comprise obtaining the registration information from the authenticated printing system and/or from the processing server.

The registration information may comprise the type of printer, the IP-address of the printer, the printer network name, the capabilities of the printer, the status (online, offline, busy, ready, out of paper, paper jam, etc) of the printer.

Typically, the part of the registration information may comprise the name or location of the printer.

The part of the registration information may be communicated by email, or preferably by being displayed on a website hosted by or on behalf of the processing server.

Obtaining from the user a selection of the printer may comprise receiving an indication of the printer is email or on a website hosted by or on behalf of the processing server.

Claim 10 defines a preferred embodiment of the method according to the present invention. The first network is preferably the internet or a wide area network, and the second network is preferable a local network such as an office network, possibly including a virtual private network, VPN, of a corporate organization or campus wide network of a higher education institute such as a University.

Preferably the second user credentials are used to gain access to the resources of the second network.

At least one of the above objects, or at least one of any of the further objects which will be evident from the below description, is according to a second aspect of the present invention achieved by the system according to claim 11.

The system according to the second aspect of the present invention is for performing the method according to the first aspect of the present invention. Thus, the above described embodiments of features of the method according to the first aspect of the present invention are applicable to the system according to the second aspect of the present invention.

Further embodiments of the system according to the second aspect of the present invention, and further embodiments of features of the system according to the second aspect of the present invention, are given below.

As the print job generating program routine provides a print job comprising the second user credentials, the print job, as seen from the point of view of the authenticated printing system, comprises the required second user credentials and may be processed. The authenticated printing system may thus perform authorization of the user, secure printing of the print job, tracking of the print job, and/or accounting of the print job as if the print job originated from for example a conventional PC and has the second user credentials in the metadata from the start.

Furthermore, the user may print the document also using a user device, e.g. a tablet PC or Smartphone, which does not comprise the software application needed for opening the document nor the printer driver needed for obtaining the print job.

The processing server may be a separate server or may be integrated as part of other software. In particular, the program routines of the processing server may be integrated with the commercially available mobile print software solution EveryonePrint, currently in version 3.3, developed by Next Print Solutions. The program routines of the processing server, and accordingly the processing server, may thus form part of the EveryonePrint software and run as part of the EveryonePrint software on a server.

In the context of the present invention, program routine is to be understood as encompassing a program module. Further, the program routine may comprise software or hardware.

Further, more than one server may run in separate virtual servers on a single physical server. In other words, an LDAP server and the tracking and accounting server may run on separate virtual servers running on a single physical server.

Furthermore the functions of different servers may be combined in a single server such that a single server may perform both authentication and tracking and accounting.

In the context of the present invention, connectable to a cloud storage system and an authenticated printing system is to be understood as encompassing interposed between a cloud storage system and an authenticated printing system.

The document retrieval program routine may comprise for example an ftp program routine configured to retrieve the print job from an ftp server provided by the cloud storage system using ftp commands. Alternatively, the document retrieval program routine retrieves the document by calling API interfaces supplied by the cloud storage system via Internet protocols, such as http or https.

A preferred embodiment of the system according to the second aspect of the present invention is defined by claim 12.

One or more of the authentication, print job tracking, accounting and print server may be combined in a single server or software.

The print server may be part of the authenticated printing system, but may also be separate from the authenticated printing system, however connected to the authenticated printing system.

The system may comprise the authenticated printing system.

A preferred embodiment of the system according to the second aspect of the present invention is defined by claim 13. The conversion program routine and the rendering program routine may be combined in a single program routine.

A preferred embodiment of the system according to the second aspect of the present invention is defined by claim 14. This is advantageous as it ensures that printing may be carried out by ensuring that both the first user credentials, often needed to access the cloud storage system and the document, and the second user credentials, required by the authenticated printing system, are available.

Preferably, the first user credentials comprise an email address, and the authentication program routine is configured to directly, or via a further program routine, contact the user by sending an email using for example the SMTP protocol to the email address.

The authentication program routine may further be configured for receiving an email with the second user credentials from the user, or for hosting a web site on which the user may input the second user credentials.

If the user credentials mapping database contains none of the first and second user credentials, the authentication program routine may be configured to obtain the first and second user credentials from the user and to forward at least the second user credentials to the authenticated printing system, or an external authentication server, such as an LDAP or Active directory server, to determine if the user with the second user credentials is allowed to use the authenticated printing system.

One embodiment of the system according to the second aspect of the present invention is defined in claim 15. This is advantageous as it provides for secure printing. As an alternative, the authenticated printing system may be configured for holding the print job in a holding queue pending receipt of a release code, for providing the release code to the user, and for releasing the print job from the holding queue upon receiving the release code from the user.

A preferred embodiment of the system according to the second aspect of the present invention is defined by claim 16.

The printer may for example be a laser printer, a reprographic machine, an ink-jet printer, etc.

The processing server may comprise a user interface program routine for hosting a website displaying the part of the registration information to the user and for receiving the selection of the printer.

At least one of the above objects, or at least one of any of the further objects which will be evident from the below description, is according to a third aspect of the present invention achieved by a computer program product according to claim 17.

The computer program product according to the third aspect of the present, when executed on a computer, causes the computer to perform the steps of the method according to the first aspect of the present invention.

The computer program according to the third aspect of the present invention may thus be used to provide the processing server of the system according to the second aspect of the present invention.

A computer usable medium may comprise a floppy disk, tape, a removable hard disk, a rewritable or non-rewritable CD or DVD, etc.

In the context of the present invention, a computer program product directly loadable into the memory of a computer is to be understood as encompassing a computer program product stored as a compressed or non-compressed file on a file server or computer or a computer program product loaded into the physical or virtual working memory, e.g. RAM, cache, or registry, of a computer. Thus a computer program product downloadable from a server is considered to be encompassed by a computer program product directly loadable into the memory of a computer.

BRIEF DESCRIPTION OF THE DRAWING

The invention and its many advantages will be described in more detail below with reference to the accompanying schematic drawing, which, for the purpose of illustration, shows some non-limiting embodiments, and in which.

DESCRIPTION OF EMBODIMENTS

In the below description, one or more signs added to a reference number indicates that the element referred to has the same or similar function as the element designated the un-superscripted reference number, however, differing in structure.

Further, where useful for discussing a plurality of identical elements, one or more subscript Latin numerals added to a reference number indicates that the element referred to is a further one of the element designated the un-subscripted reference number.

When further embodiments of the invention are shown in the FIGURES, the elements which are new in relation to earlier shown embodiments have new reference numbers, while elements previously shown are referenced as stated above. Elements which are identical in the different embodiments have been given the same reference numerals and no further explanations of these elements will be given.

Figure 1:
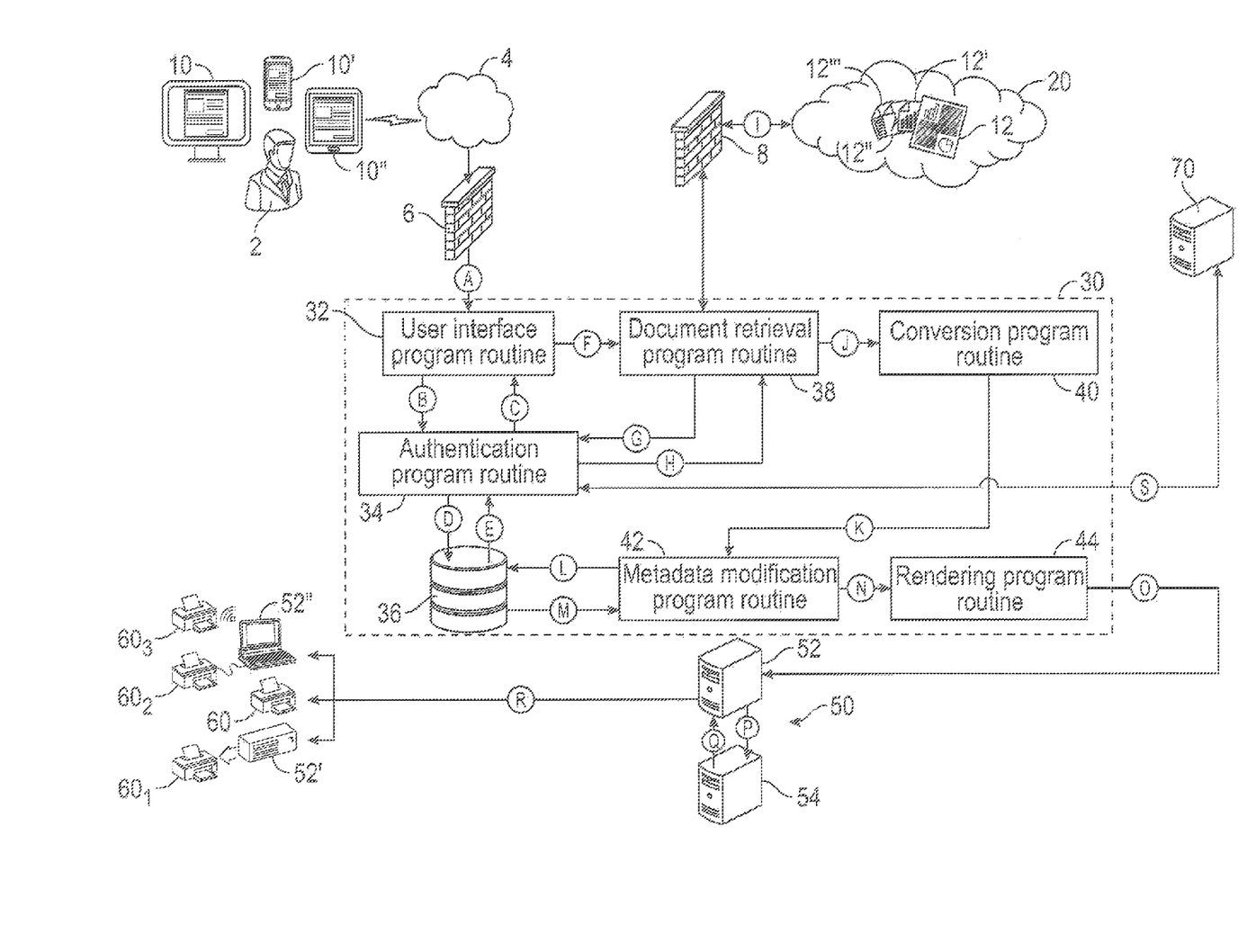
FIG. 1 shows a first embodiment of a method of handling a document stored in a cloud storage system for processing by an authenticated printing system and a system for performing the method according to the first and second aspects of the present invention.

FIG. 1 shows a first embodiment of a method of handling a print job submitted to a cloud storage system for processing by an authenticated printing system and a system for performing the method according to the first and second aspects of the present invention. A user 2 may use any of a desktop PC 10, a Smartphone 10' or a tablet PC 10", each representing a user device, to cause the printing of a document 12. The document 12 may for example be a presentation file 12, a spread sheet file 12', a pdf file 12" or a text file 12'". The document 12 is stored in a cloud storage system 20.

In order to print the document 12, the user 2 in step A, using any of the user devices 10, 10' or 10", connects via network 4 and firewall 6 to a processing server 30. The processing server 30 is operated by a corporate organization or a higher education institution such as for example "Acme University". The processing server 30 is interposed in the path of the document 12 between the cloud storage system 20 and the authenticated printing system 50 of "Acme University" and the printer 60 operated by "Acme University".

The processing server 30 comprises a user interface program routine 32 for hosting a website to which the user may navigate using any of the user devices 10, 10' or 10". The user interface program routine 32 is connected to an authentication program routine 34. The user 2, upon connecting to the processing server 30, i.e. to the user interface program routine 32, may, if it is the first time that the user 2 wishes to print a document, submit first user credentials, with which he has a user account with the cloud storage system 20, and second user credentials associated with the first user credentials and identifying the user 2 to the processing server 30 in step B. The authentication program routine 34 may in step C report the result of the authentication to the user interface program routine 32 to indicate to the user if he has been authenticated.

The first user credentials may for example be user 2's private email address and a password, a user name and a password, or the IP-address of the user 2.

In step B and C the user 2 may use the first or second user credentials to identify himself to the processing server, or may alternatively use third user credentials to identify himself to the processing server 30. If it is the first time that the user 2 connects to the processing server, the first and second user credentials supplied by the user 2 are forwarded in step D by the authentication system 34 to the user credentials mapping database 36 for future use. A confirmation of a successful registration and mapping of the first and second user credentials in the user credentials mapping database may if desired be forwarded to the authentication program routine 34 by the user credentials mapping database 36 in step E for further forwarding to the user interface program routine to indicate to the user 2 that registration and mapping of the first and second user credentials has been successful.

The user interface program routine 32 provides the user 2 with the possibility of uploading documents to the cloud storage system 20 and to print documents in the cloud storage system. Using the first user credentials, the user interface program routine 32, together with a document retrieval program routine 38, accesses the cloud storage system 20 and the user amount associated with the user 2, through firewall 8, to display on the web site hosted by the user interface program routine 32 the documents 12, 12', 12" and 12'".

The document retrieval program routine 38 may request and obtain the first user credentials in steps G and H from the user credentials mapping database 36 via the authentication program routine 34 for use in accessing the user account associated with user 2.

The cloud storage system 20 may further authenticate the user 2 to determine if the user 2 has access to the cloud storage system.

The user 2 then indicates on the web site which of the documents 12, 12', 12" and 12'" he wishes to print. The document retrieval program routine 38 now retrieves in step I the selected document 12 from the cloud storage system 20 using, in the case of the cloud storage system being Google Drive™, the Google Drive™ API, which includes commands such as drive.files.list, to get a list of the user's files and other commands.

The indication of which of the documents 12, 12', 12" and 12'" to print may be made by clicking on an icon representing the document 12 or by typing in the file name of document 12.

To access the Google Drive™ API, the document retrieval program routine has an authorized API access that uses the Oauth 2.0 standard for allowing the processing server 30 to retrieve the document 12 from the cloud storage system 20.

The document 12 is then downloaded or retrieved by the document retrieval program routine 38 in step I and forwarded to a document conversion program routine 40 in step J. The document conversion program routine 40 converts the document 12 using the software application corresponding to the format of the document 12 in a first step to read the document, and a printer driver for obtaining a print job based on the document 12 in a second step. The conversion program routine 40 may not be needed where the document is directly printable by a printer.

The print job comprises metadata including the first user credentials for identifying the user 2 as the owner of the print job.

The print job is then in step K sent to a metadata modification program routine 42 in which the entry in the metadata referring to the first user credentials is exchanged for the second user credentials. The second user credentials are obtained from the user credentials mapping database 36 by querying the user credentials mapping database 36 using the first user credentials for obtaining the second user credentials in steps L and M. The metadata modification program routine 42 now supplants the first user credentials with the second user credential in the metadata of the print job.

The conversion program routine 40 and the metadata modification program routine 42 may be combined into a single program routine for obtaining a print job comprising print job metadata comprising the second user credentials in a single program routine.

The print job is then sent to a rendering program routine 44 in step N in which it is rendered into a bitmap suitable for printing by a printer. The rendered print job is in step O sent to an authenticated printing system 50, which comprises a print server 52, and an authentication, tracking and accounting server 54. The print job is first analyzed by the print server 52 to determine the destination, i.e. which printer is to print the print job. Additionally the print job metadata are supplied to the authentication, tracking and accounting server 54 in step P. The authentication, tracking and accounting server 54 comprises a database of a plurality of second user credentials, one of the plurality of second user credentials corresponding to the second user credentials comprised by the print job metadata for authenticating the user 2 as being allowed to use the printers connected to the authenticated printing system 50.

Further the authentication, tracking and accounting server 54 may comprise an active print job database comprising details of every print job currently printing on the printers or temporarily stored by the print server 52 in order to track the progress of each print job. The authentication, tracking and accounting server 54 also comprises a database of user accounts, each user account being associated with one of the plurality of second user credentials, comprising setting or quotas in controlling and restricting printing on a per user basis. The settings may for example comprise settings or rules for limiting which printers are available to each user, including the user 2, and the quotas may comprise a maximum number of pages printable per user, including user 2, and month or year. Further the rules may include rules which disallow the user from printing any colour print jobs, only allowing the user to print in black/white.

After the authentication, tracking and accounting server 54 has determined that the user 2 is allowed to print the print job, e.g. by determining that the quota corresponding to the user 2 is not yet met and will not be exceeded by printing the print job, then the authentication, tracking and accounting server 54 communicates this to the print server 52 in step Q, following which the print server 52 sends the print job to the printer 60 in step R for printing. The printer 60 then directly, or after temporarily storing the print job in the memory of printer 60, prints the print job.

Thus, as can be seen in FIG. 1, the first embodiment of the method and system according to the first and second aspects of the present invention allows the user 2 to print the document 12 on the printer 60 connected to the authenticated printing system 50 using the cloud storage system 20, despite having first user credentials for identifying the user 2 to the cloud storage system and second user credentials for use with the authenticated printing system 50. This allows an integration of the cloud storage system 20 with the authenticated printing system 50 and affords the user 2 the advantage of being able to easily, and from any location where it is possible to communicate with the cloud storage system 20, print the document 12 while at the same time affording an administrator of the authenticated printing system 50 and/or operator of the printer 60 the possibility of controlling and limiting usage, i.e. printing on the printer 60 as afforded by a conventional printing system, i.e. one which requires the user 2 to submit the document 12 directly to the print server 52 and in which the user 2 uses a single user credentials, i.e. the second user credentials.

As an alternative to the printer 60, the print job may in step R be sent to the printer $60_1$ via a secondary print server 52'. In a further alternative, the print job is sent in step O to wired printer $60_2$ or wireless printer $60_3$, any of which may be connected to a secondary print server embodied by laptop computer 52" comprising wired and wireless interfaces for communication with the respective printers $60_2$ and $60_3$.

If the user 2 desires to use printing with secure release, i.e. printing where the print job put in a holding queue and is not printed until requested by the user 2 while being present at the location of the printer 60, then the print server 52 may hold the print job in the holding queue until a release code or the password associated with the second user credentials is input by the user 2 on the printer 60 or on a web-site hosted by the print server 52.

If the first user credentials comprise the email address of user 2, then the release code may be sent to this email address.

If the first and second user credentials for the user 2 are stored in the user credentials mapping database 36, for example on account of the user 2 having printed on the authenticated printing system 50 before or on account of an administrator having loaded the first and user credentials into the user credentials mapping database 36, the user 2 does not need to submit his first user credential when interacting with the website hosted by the user interface program routine 32 in step A. In this case, it is sufficient if the user 2 identifies himself in step A using the second user credentials, as the document retrieval program routine may then retrieve the first user credentials as needed in access the cloud storage system 20.

Further, if the user 2 knows that his first user credentials are not stored and mapped to his second credentials in the user credentials mapping database 36, he may, as described above, submit his first user credentials in step A while interacting with the website.

It may however occur that the user 2 submits only his second user credentials in step A, falsely believing that his first user credential are stored in the user credentials mapping database 36. In this case, either the user program interface 32, upon receiving the input of the second user credentials from the user 2, may perform a check of the user credentials mapping database 36 using the authentication program routine 34 and subsequently prompt the user 2 to supply his first user credentials if no such first user credentials are found in the check. Alternatively, the document retrieval program routine 38, when trying to obtain the first user credentials from the user credentials mapping database 36 in steps G and H, and failing to do so, may instruct the user interface program routine 32 to obtain the first user credentials from the user 2. In case the user 2 has already left the website hosted by the user interface program routine 32, the user interface program routine 32 may try to contact the user 2 using the second user credentials, typically the case where the second user credentials is an email address, a network name, a telephone number etc., or alternatively details of the indication of the document 12 to be printed may be stored in a list of failed print jobs so that the next time the user 2 access the website hosted by the user interface program routine 32, the user 2 is confronted with the failed print job and prompted to provide his first user credentials.

If in step B and C the authentication program routine 34 is not able to find the second user credentials associated with the second user 2, it may in some cases be so that the authentication program routine connects in optional step S an external authentication server 70, which for example may be an Active directory or LDAP server. Where the user 2 is authenticated for use of the authenticated printing system 60 using the external authentication server 70, the second user credentials found in the external authentication server 70 are preferably copied by the authentication program routine 34 and stored in the user credentials mapping database 36.

The processing server 30 may further comprise a printer registration program routine which continuously receives information of the printers 60, 60₁, 60₂ and 60₃ from the print server 52 or a printer directory (not shown) internal to the processing server 30 for communicating this list to the user interface program routine 32 for presenting a list of the printers available to the user 2 on the website which the user 2 accesses. The printer registration program routine may filter the list based on the second user credentials to only show those printers that are accessible to the user 2. This may for example be done by the printer registration program routine communicating with the authentication, tracking and accounting server 54 for obtaining a list of printers which the user 2 is allowed to print to.

Typically, the processing server is placed within a local network in which the authenticated printing system 50 is also placed. The user 2 may interact with the user interface program routine 32 from within the local network, or as shown in FIG. 1, from a network outside the local network. The cloud storage system 20 is typically as shown in FIG. 1 located in a network outside the local network. The external authentication server 70 is typically placed within the local network.

LIST OF PARTS WITH REFERENCE TO THE FIGURES

2. User
4. Network
6. First firewall
8. Second firewall
10. User device
12. Document
20. Cloud storage system
30. Processing server
32. User interface program routine
34. Authentication program routine
36. User credentials mapping database
38. Document retrieval program routine
40. Conversion program routine
42. Metadata modification program routine
44. Rendering program routine
50. Authenticated printing system
52. Print server
54. Authentication, tracking and accounting server
60. Printer
70. External authentication server

The invention claimed is:

1. A method of handling a document stored in a cloud storage system, in which a user is identified by first user credentials, for processing by an authenticated printing system for which said user is identified by second user credentials, comprising the steps of
 i. obtaining said document from said cloud storage, said first user credentials being associated with said document,
 ii. obtaining said second user credentials based on said first user credentials, wherein said second user credentials are obtained by contacting the user using the first user credentials from the user and obtaining the second user credentials from the user,
 iii. obtaining a print job corresponding to said document, said print job comprising print job metadata comprising said second user credentials, and
 iv. forwarding at least said print job metadata, comprising said second user credentials, to said authenticated printing system for said processing,
 wherein the steps of the method are performed by a processing server serving as an intermediary between the cloud storage system and the authenticated printing system.

2. The method according to claim 1, said processing by said authenticated printing system comprising one or more of the steps:
 v. authenticating said user using said second user credentials,
 vi. tracking said print job using said second user credentials,
 vii. accounting said print job, using said second user credentials, to an account associated with said user, or
 viii. forwarding said print job to a printer for printing.

3. The method according to claim 2, said obtaining of said print job comprising converting said document for making it printable by a printer, and optionally also rendering said print job.

4. The method according to claim 2, said obtaining of said document comprising receiving, from said user, a reference to said document.

5. The method according to claim 1, said obtaining of said print job comprising converting said document for making it printable by a printer, and optionally also rendering said print job.

6. The method according to claim 5, said obtaining of said document comprising receiving, from said user, a reference to said document.

7. The method according to claim 1, said obtaining of said document comprising receiving, from said user, a reference to said document.

8. The method according to claim 1, said obtaining of said second user credentials comprising:
 querying a user credentials mapping database using said first user credentials, and
 in response to said first user credentials not being found in the user credentials mapping database, or said second user credentials not being found in said user credentials mapping database or mapped to said first user credentials,
 obtaining said second user credentials from said user.

9. The method according to claim 8, said first user credentials comprising an email address associated with said user and said obtaining of said second user credentials from said user comprising contacting said user using said email address.

10. The method according to claim 8, said obtaining of said second user credentials from said user comprising storing said second user credentials in said user credentials mapping database, and mapping said second user credentials to said first user credentials in said user credentials mapping database.

11. The method according to claim 1 further comprising the steps of
 ix. holding said document or said print job in a holding queue pending receipt of a release code,
 x. providing said release code to said user, and
 xi. receiving said release code from said user and releasing said document or said print job from said holding queue.

12. The method according to claim 1, said processing by said authenticated printing system comprising forwarding said print job to a printer, the method further comprising the steps of xii. obtaining registration information on said printer, xiii. communicating at least part of said registration information to said user, and xiv. obtaining from said user a selection of said printer based on said part of said registration information.

13. The method according to claim 1, said cloud storage system being provided on a first network, such as the internet, and said authenticated printing system being provided on a second network, such a network associated with a corporate organization or higher education institution.

14. A system for performing the method according to claim 1, comprising a processing server connectable to cloud storage system and an authenticated printing system, said processing server comprising:

a document retrieval program routine for obtaining said document from said cloud storage, said first user credentials being associated with said document, a user credentials mapping database for providing said second user credentials based on said first user credentials, and a print job generating program routine for providing a print job corresponding to said document, said print job comprising print job metadata comprising said second user credentials, said processing server further being configured to forward at least said print job metadata comprising said second user credentials, to said authenticated printing system for said processing.

15. The system according to claim 14, said authenticated printing system comprising one or more of:

an authentication server for authenticating said user using said second user credentials, a print job tracking server for tracking said print job using said second user credentials, or an accounting server for accounting said print job, using said second user credentials, to an account associated with said user, and possibly also a print server for forwarding said print job to a printer for printing.

16. The system according to claim 14, said print job generating program routine comprising:

a conversion program routine for converting said print job for making it printable by a printer, and optionally also a rendering program routine for rendering said print job.

17. The system according to claim 14, said processing server further comprising:

an authentication program routine for determining if one of said first user credentials and said second user credentials is found in said user credentials mapping database, and if so, whether both of said first and second user credentials are found in the database, said authentication program routine further being configured to contact said user if one of said first and second user credentials is not found in said user credentials mapping database for obtaining the missing one of said first and second user credentials from said user, said authentication program routine further being configured to, upon receiving the missing one of said first and second user credentials, store said first and second user credentials in said user credentials mapping database for mapping said second user credentials to said first user credentials in said user credentials mapping database.

18. The system according to claim 14, said processing server further being configured for holding said document or said print job in a holding queue pending receipt of a release code, for providing said release code to said user, and for releasing said document or said print job from said holding queue upon receiving said release code from said user.

19. The method according to claim 14, said system further comprising a printer connected to said authenticated printing system, or alternatively said authenticated printing system comprising a printer, said processing server further comprising a printer registration program routine for communicating at least part of said registration information to said user, and for obtaining from said user a selection of said printer based on said part of said registration information.

20. A computer program, stored on a non-transitory computer readable medium, which when executed on a computer causes said computer to perform the steps of the method according to claim 1.

* * * * *